May 26, 1931. W. R. HUME 1,806,855
METAL WORKING APPARATUS
Filed April 8, 1926 3 Sheets-Sheet 1
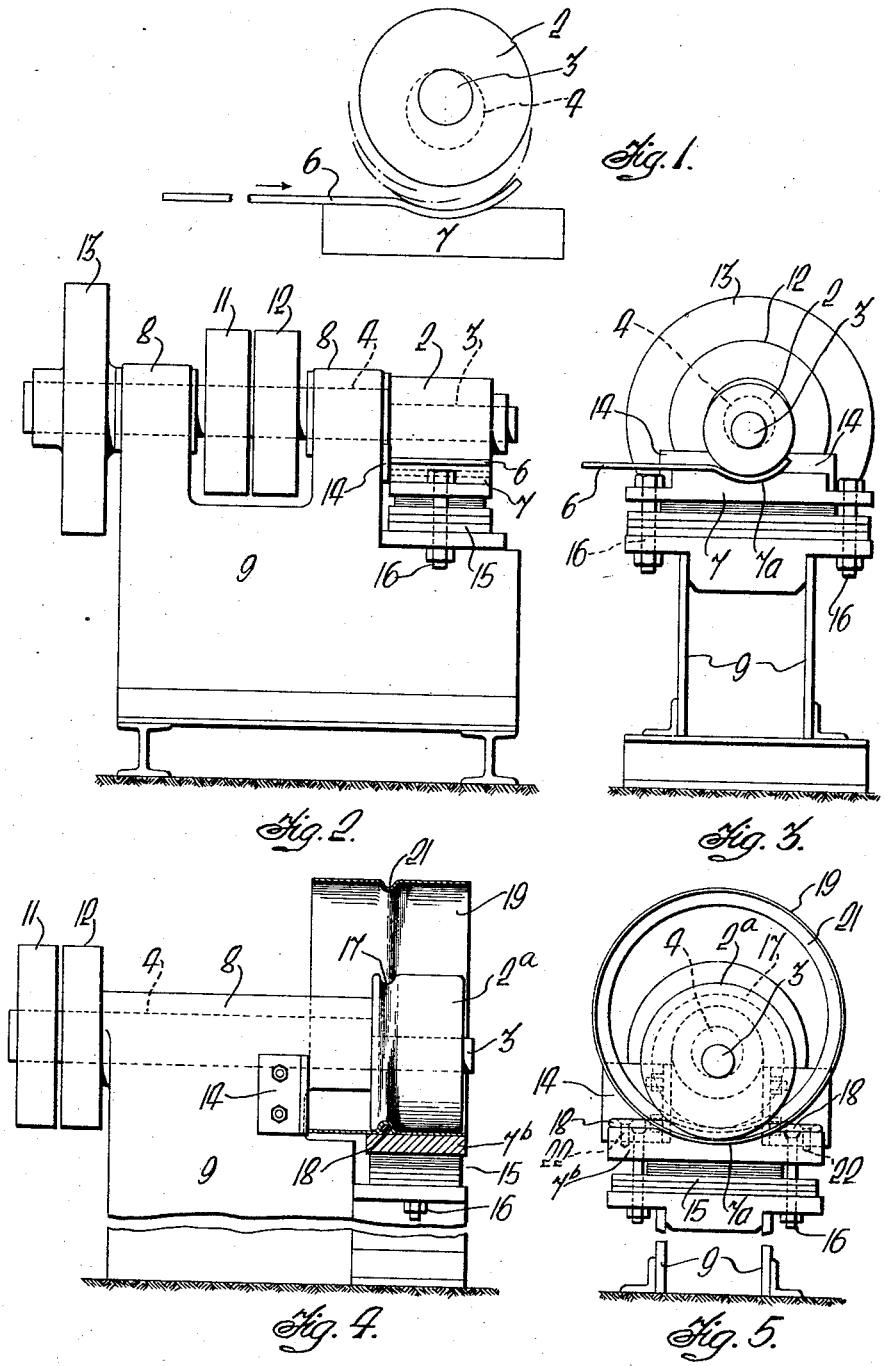

May 26, 1931. W. R. HUME 1,806,855
METAL WORKING APPARATUS
Filed April 8, 1926 3 Sheets-Sheet 2

Inventor
W. R. Hume

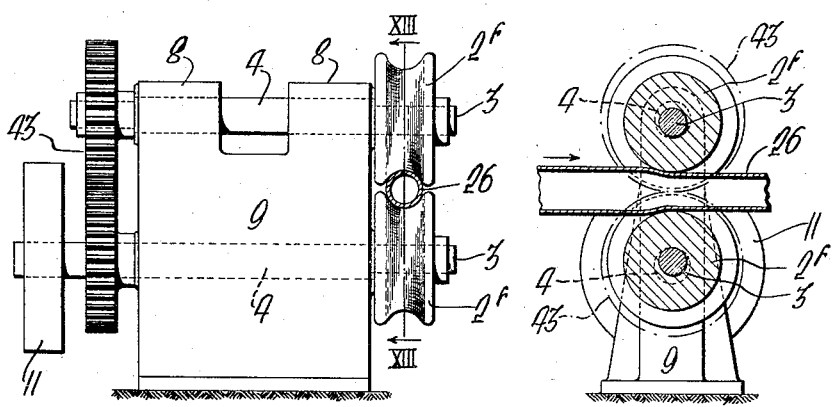
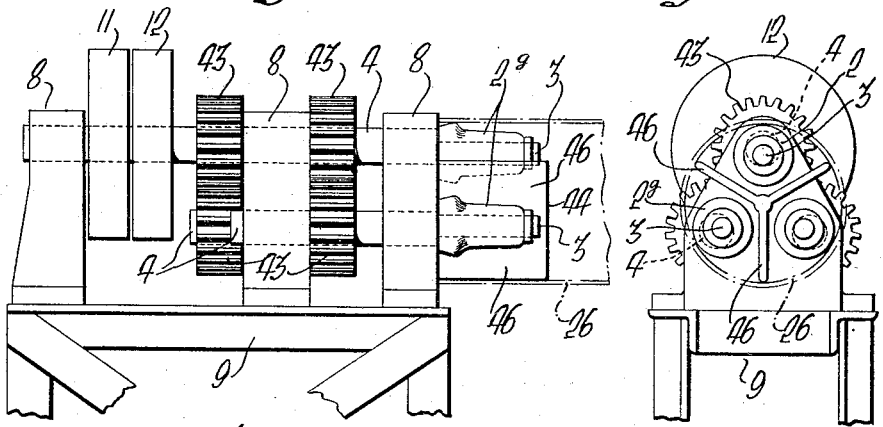
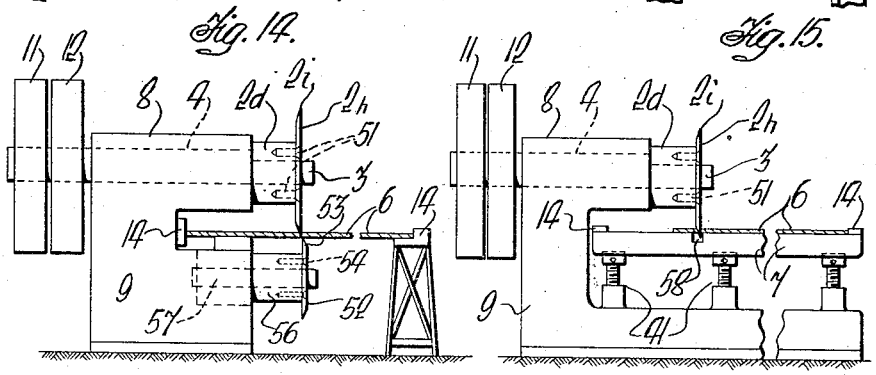

Patented May 26, 1931

1,806,855

UNITED STATES PATENT OFFICE

WALTER REGINALD HUME, OF MELBOURNE, VICTORIA, AUSTRALIA, ASSIGNOR TO HUME STEEL LIMITED, OF MELBOURNE, AUSTRALIA

METAL WORKING APPARATUS

Application filed April 8, 1926, Serial No. 100,640, and in Australia May 7, 1925.

This invention relates to the bending, forging, shaping, cutting and like treatment of steel and other metal sheets, bars, pipes and other bodies.

While the invention is particularly applicable for use in the bending of steel sheets or plates for the manufacture of sheet metal pipes, collars and the like and the shaping of such pipes and collars, it is also capable of application to many other purposes as will be evident from the following description and accompanying drawings.

It is common practice to impart a reciprocatory action to metal punchers, cutters and the like by means of eccentric or crank operating mechanism; and while the present invention has, in some of its applications, features of similarity with such devices it will be hereinafter evident that the invention possesses important characteristics differing essentially from such known devices, and is, moreover, applicable to many purposes to which such known devices are quite unapplicable.

Briefly stated the invention embodies an improved method and means whereby a combined rolling and percussive action may be imparated directly to the work such as a metal sheet or bar. This action is obtained through the medium of one or more eccentrically mounted forming members or rollers which cause the requisite pressure to be intermittently, but gradually imparted to the desired object with a rolling action, whereby friction is reduced to a minimum.

But in order that this invention may be better understood reference will now be made to the accompanying drawings which are to be taken as part of this specification and read herewith:—

Figure 1 is a diagrammatic view illustrating the modus operandi of the invention.

Figure 2 is a side elevation of apparatus, embodying the invention, suitable for shaping metal strips into circular formation for subsequent joining to form collars such as are used for pipe joints.

Figure 3 is an end view of Figure 2.

Figure 4 is a side elevation of apparatus, embodying the invention, suitable for expressing an internal rib or bead around the inner periphery of a collar to be used for joining pipes.

Figure 5 is an end view of Figure 4.

Figure 12 is a side elevation of apparatus, embodying the invention, for swaging pipes to lesser diameters.

Figure 13 is a cross section taken on the line XIII—XIII in Figure 12.

Figure 14 is a side elevation of another form of apparatus, embodying the invention, suitable for expanding the end portions of metal pipes into faucet shape.

Figure 15 is an end view of Figure 14.

Figure 16 is a side elevation of apparatus embodying the invention, for shearing metal plates or sheets.

Figure 17 is a contracted side elevation of apparatus for shearing metal plates, according to a modification.

Similar reference numerals are employed throughout the specification and drawings to denote like or corresponding parts.

Figures 6, 7:
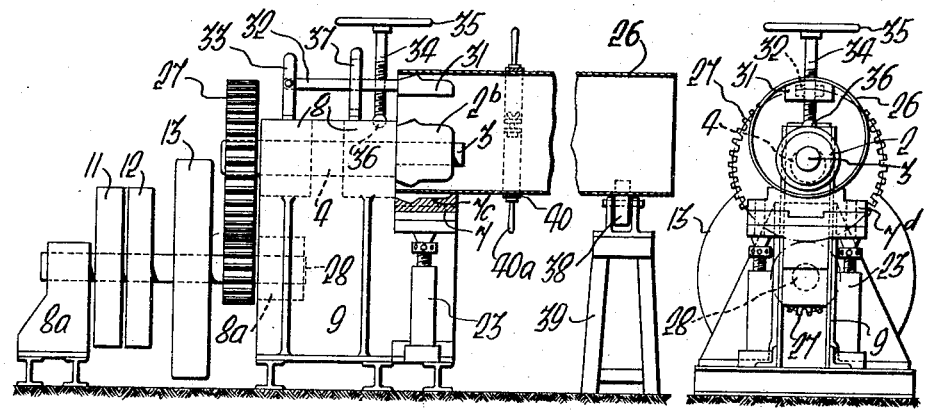
Figure 6 is a side elevation of apparatus, embodying the invention, for expanding the end portions of metal pipes into bell or into faucet shape.
Figure 7 is an end view of Figure 6, certain parts being omitted for convenience of illustration.

Referring to Figure 1 the reference numeral 2 indicates a rotary forming member or roller, of substantially circular formation in cross section, which is loosely or freely mounted upon an axle member 3 formed eccentric with a driving and supporting axle or shaft 4. During rotation of the driving shaft 4 the forming member 2 will contact with the work or material under treatment, represented in the present instance by a metal sheet or section 6 supported by an anvil 7, for a certain period during each revolution of the driving shaft, while the forming member is free to rotate about its axle 3 throughout operations. Various positions of the eccentrically mounted forming member 2 are indicated by broken lines. Pressure will thus be intermittently and gradually applied to the work and, owing to the roller or forming member being free to rotate about its axis, friction will be reduced to a minimum, while wear on the forming member will be evenly distributed over its periphery. During its periods of engagement with the work the eccentrically mounted forming member tends to assist the operator in feeding the work forwardly, so that, by arranging suitable guides for the work, operations may be carried out in a most efficient and expedient manner and are readily controllable by an operator whose labour is rendered comparatively light.

The above and various other advantages arising from the invention will, however, be in part apparent and fully explained hereinafter with reference to apparatus, incorporating the invention, which has been devised for various treatment of metal sheets, pipes and other bodies.

In one of its simplest forms, the invention is particularly applicable to the bending of flat strips of metal into collars such as are commonly used for joining pipes. In such application a rotary forming member, constituted by a roller 2, is freely mounted upon an eccentric or crank pin 3 projecting from one end of a shaft 4, as seen in Figures 2 and 3. The shaft 4 may be supported in bearings 8 on a suitable framework 9 and may carry fast and loose pulleys 11 and 12 for transmitting power to the shaft. The shaft may also have a flywheel 13 mounted thereon. An anvil 7 may have its upper surface 7a dished or concave to conform to the curvature which it is desired to impart to the metal sheet or section 6. The periphery of the roller 2 intermittently and forcibly engages the work 6 during each revolution of the shaft 4 whereby pressure is gradually applied to shape the material 6 to the desired form. The friction incidental to the bending operation is minimized by the action of the eccentrically mounted roller 2 as aforesaid. Furthermore as the work 6 is intermittently freed from engagement by the roller 2 during each rotation of the shaft 4, any irregularities or defects may be corrected during the periods when the roller is moving idly. Suitable guides 14 may be provided to guide the feeding motion of the work which is positioned so that one of its side edges bears against the guides. The anvil 7 may be detachably held in position by bolts 16 whereby it may, if so desired, be readily removed and replaced by an anvil of different size or shape. Means, such for example as packing strips 15, may also be provided for adjusting the position of the anvil relative to the roller 2 to allow of variation in the thickness of the work or in the size of the roller 2.

Figures 4 and 5 are views of apparatus similar to that seen in Figures 2 and 3, but which is adapted to form an annular rib or bead around the inner periphery of a collar or sleeve member such as used for jointing pipes, the presence of the internal rib or bead in the jointing collar facilitating the effective ramming of jointing material within the collar. Accordingly instead of a plain roller 2, we employ a roller 2a having in its outer periphery an annular groove 17 disposed in alignment with a die member 18 on the anvil 7b, whereby the portion of the collar 19 in alignment with the groove 17 and die 18 will be pressed inwardly as seen in Figure 4, so that eventually an internally projecting bead 21 will be formed completely around the collar 19. The said groove in the roller 2 may be located adjacent the inner end thereof and suitable guides 14 may be positioned inwardly from the roller to enable the bead 21 to be formed intermediately of the length of the collar. The die member 18 may consist of an arcuate section of metal which may be detachably secured at its ends by screws 22 to the upper face 7a of the anvil 7b. It will be evident that the die 18 may be formed integral with the anvil 7b. It will also be understood that a variety of shapes may be imparted to the work by employing rollers 2a of appropriate profile and correspondingly shaped dies 18 and/or anvils 7b.

Figure 8:
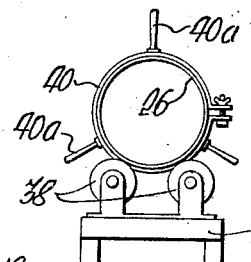
Figure 8 is an end view of the parts omitted from Figure 7.

The apparatus illustrated in Figs. 6, 7 and 8 is particularly suitable for expanding the end portions of pipes into faucet formation. In this embodiment the profile of the rotatable forming member 2b and the upper surface 7c of an anvil 7d are appropriately shaped so that the end portion of a pipe 26 may be progressively expanded into faucet shape by the combined percussive and rolling action of the forming member. The shaft 4 may be driven by toothed gearing 27 from a companion shaft 28 supported in suitable bearings 8a. Fast and loose pulleys 11 and 12 and a flywheel 13 may be mounted on the shaft 28. The anvil 7d may be supported by jacks 23 or other suitable adjustable devices.

In order to support the pipe while it is undergoing treatment, and to enable the pipe ends to be expanded to true faucet shape, a bearer 31 carried at one end of an arm 32 may project into the adjacent end of the pipe so that the latter may rest upon the bearer. The arm 32 may be pivoted at its inner end to a projection 33 upstanding from the frame-work 9 or an adjacent bearing 8. An adjusting screw 34, fitted with an operitting wheel 35, may pass through a screw threaded aperture in the arm 32 and have a ball and socket or similar connection 36 at its lower end in the top of the adjacent bearing 8, whereby the arm may be swung about its pivot to raise and lower the bearer 31 as required. By manipulation of the hand-wheel 35 the bearer may be raised, during expanding or shaping operations, to thereby prevent sections of the pipe end which have been expanded by the action of the roller 2b, from being drawn out of shape. This enables pipe ends to be expanded to true faucet shape. It will also be evident that by adjustment of the bearer 31 pipes of different sizes may be supported for treatment. A slotted guide member 37 may be provided to prevent side play of the arm and the bearer. The upper or contacting surface of the bearer 31 is preferably shaped to conform with the faucet formation to be imparted to the pipe.

The pipe undergoing treatment is also supported adjacent its outer or overhanging end; preferably by a pair of idle rollers 38 suitably mounted upon a table 39 and adapted to contact with the periphery of the pipe. A ring 40, having outstanding hand pieces 40a, may be detachably applied around the pipe whereby the operator is enabled to readily control the movement of the latter.

Figures 9, 10:
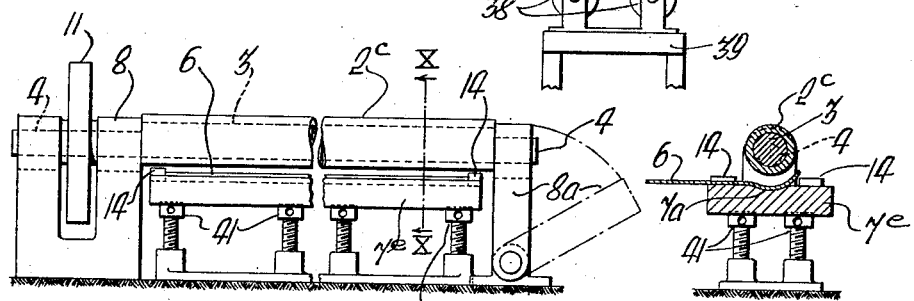
Figure 9 is a contracted side elevation of apparatus, embodying the invention, suitable for bending metal sheets or plates into circular form for the manufacture of pipes.
Figure 10 is a cross section taken on the line X—X in Figure 9.

According to the constructional embodiment illustrated in Figures 9 and 10, which is particularly suitable for rolling metal plates or sheets into tubular form, a shaft 4 of any desired length is mounted at each end in suitable bearings 8, the intermediate portion 3 of the shaft being eccentric to its end portions and providing an axis for a forming member such as a sleeve or roller 2c which is free to rotate about its eccentrically moving axis. An appropriately shaped anvil 7e is located beneath the roller and may be supported by suitable jacks 41, or other devices whereby the anvil may be raised and lowered to accommodate metal plates 6 of different thickness. The bearing 8a supporting one end of the shaft 4 may be removable or adapted to swing outwardly from said end of the shaft 4, as indicated in broken lines in Figure 9, so that after a metal sheet has been bent around the roller 2c the resultant curved or tubular object may be withdrawn longitudinally therefrom. Guides 14 may be positioned at the ends of the anvil for guiding the feeding motion of the plates 6 during bending operations.

Figure 11:
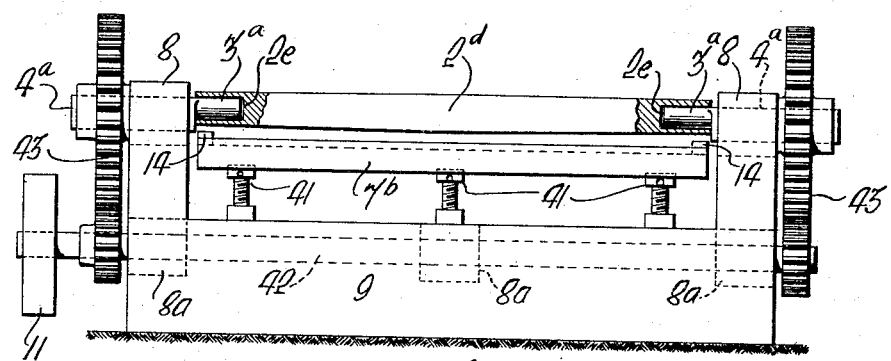
Figure 11 is a side elevation of modified apparatus for bending metal sheets or plates into circular form for the manufacture of pipes.

According to a modification of the construction described in the last preceding paragraph, a circular forming roller 2d may be provided at its ends with axial recesses 2e to freely accommodate two relatively short cranks or eccentric portions 3a of co-aligned shafts 4a supported by bearings 8 as seen in Figure 11. Rotary motion may be transmitted to the shafts 4a from a countershaft 42, by gearing 43 or the like, whereby the roller 2d will be caused to move eccentrically while being free to rotate about the cranks or eccentrics 3a. The countershaft is supported by bearings 8a and may be furnished with a pulley 11. The shafts 4a may be withdrawn longitudinally from the ends of the roller 2d so that the latter may be rolled out of position to allow endwise removal of the curved plate or object therefrom, or for the purpose of interchanging the roller. This roller is also preferably mounted above an anvil 7f between which and the roller the work is fed and guided as previously mentioned.

In instances where the forming roller is relatively long and of small diameter and the plates to be treated are relatively thick the roller may be suitably cambered whereby the diameter is increased from its ends towards its middle thus obviating any liability of the roller bending. The roller 2a in Figure 11 has this camber formation slightly exaggerated. By means of the invention as exemplified in Figures 9, 10 and 11 metal sheets may be effectively rolled throughout their entire length without the necessity of finishing the bending operation by hammering the end portion of the sheet, as is usually necessary with the ordinary, and much more complicated and expensive multiple roller bending machines at present in common use.

In some cases two or more of the eccentric or crank operated rollers may be employed, for instance in swaging metal pipes and the like to lesser diameters, a pair of suitably shaped rollers 2f (see Figures 12 and 13) may be mounted in juxtaposition or one above the other upon eccentric or crank pins 3 outstanding from shafts 4 which are suitably supported and driven. By feeding a pipe 26 between these rollers the combined rolling and percussive action developed thereby is imparted to the pipe with the result that it is rapidly and uniformly reduced to the desired size.

The use of a plurality of the eccentrically operated rollers may also be applied to such purposes as the expansion of hollow objects, for instance, the flaring of the ends of metal pipes and the like preparatory to forming faucets thereon or for other purposes. Such an embodiment of the invention is illustrated in Figures 14 and 15, wherein a group of rollers 2g is mounted on crank or eccentric pins 3 at the adjacent ends of parallel shafts 4 which are spaced at the desired distances apart. The shafts are supported in bearings 8 and are driven in unison through gearing 43 or the like, one of the shafts 4 having fast and loose pulleys 11 and 12 mounted thereon. The rollers may have any desired peripheral profile according to the shape which is to be imparted to the pipe, and by placing the open end of a pipe 26 around the group of rollers 2g the pipe will be expanded to the desired size and form by the outward pressure of the rollers as they intermittently and forcibly engage the interior of the pipe. A self centering bearer 44 comprising a series of radial vanes 46, adapted for attachment to an adjacent bearing 8 so as to extend between the rollers 2g, may be provided in order to support the end portion of the pipe or like object while it is undergoing treatment. The overhanging portion of the pipe may be supported in a manner similar to that previously described and as illustrated in Figures 6 and 8 while means similar to those illustrated in said figures may be provided to enable the operator to exercise positive control of the pipe during operation. If desired the expanded or flared end of the pipe or the like may be subsequently operated on to form a faucet or other special shape by placing it around a single eccentrically mounted roller having the desired peripheral profile and operating in conjunction with an adjacent anvil member, such as previously mentioned and as illustrated in Figures 6, 7 and 8.

In applying the invention to the cutting or shearing of metal the eccentrically moving forming member or roller takes the form of a cutting disc or wheel 2h having a sharpened edge 2i as seen in Figure 16. The cutting disc 2h may be detachably held by screws 51 to a roller 2d freely mounted upon an eccentric portion 3 of a shaft 4. This cutting disc may operate in conjunction with a stationary or rotatable cutter which may take the form of a blade or disc 52 having a sharpened edge 53 which is opposed to that of the disc 2h, so that by moving the work 6 between the two co-operating cutters the operation of the eccentrically mounted cutting disc 2h causes the material to be cut or sheared as the cutting edge of the disc 2h intermittently engages the metal. The disc 52 may be held by screws 54 to a roller 56 which is freely and preferably concentrically mounted upon a pin or spindle 57. Alternatively, as seen in Figure 17, the eccentrically operating cutter 2h may operate above a table or anvil member 7h upon which the work rests as it passes beneath the cutter and which may have a slot or channel 58 disposed in alignment beneath the cutter. An important advantage incidental to the cutting or shearing of metal in accordance with the invention is that any departure of the cutting disc 2h from the desired cutting path may be easily corrected by the operator owing to the fact that the work is intermittently released during each rotation of the driving shaft 4. Furthermore friction is reduced to a minimum and an effective and rapid cutting operation is ensured.

There may be a tendency for the cutting disc 2h to exert a dragging effect upon the work as the said disc moves into and out of engagement with the work, and in order to overcome this, braking mechanism may be associated with the cutting disc 2h or its operating means for the purpose of automatically and momentarily retarding the motion of the cutting disc at the desired period or periods.

By the invention great power may be transmitted through the eccentrically operated roller or rollers, the apparatus being at the same time extremely simple, inexpensive and convenient.

It will also be evident that the invention is capable of many and various practical applications as previously indicated and that various constructional modifications and arrangements may be employed in carrying out the invention without departing from its nature, spirit and scope as defined by the appended claims.

Having now described my invention what I claim as new and desire to secure by Letters Patent is:—

1. An apparatus for forming metal bodies comprising a work support for the body to be treated, a forming member mounted on an axle above the work support and arranged for idle concentric movement relative to such axle, and means for moving the axle bodily through a path concentric with a fixed center, the bodily movement of the axle moving the forming member into and out of contact with work on the work support, while the idle mounting of the member on the axle provides for free rolling contact of such member with the work on the work support.

2. An apparatus for forming metal bodies comprising a work support, a forming member mounted for idle concentric movement on an axle and including a roller, and means for moving the axle bodily through a path concentric with a fixed center, the bodily movement of the axle causing the free moving roller to be moved into and out of contact with the work on the work support.

3. An apparatus for forming metal bodies comprising a work support, a forming member mounted for free rotation and bodily movable about a fixed center out of line with its axis of rotation, the bodily movement of the forming member causing it to move into and out of contact with the work on the work support without interference with the free rotation of said member about its axis.

4. An apparatus for forming metal bodies comprising a work support, a driving shaft, an axle projecting eccentrically therefrom, a forming member mounted for concentric idle movement on the axle, the pivotal movement of the forming member incident to the eccentric relation of the axle and shaft causing the forming member to move into and out of contact with the work on the work support, and means for guiding the work on the work support during intermittent contact of the forming member therewith.

5. An apparatus for forming metal bodies comprising an anvil, a driving shaft arranged above the anvil, an axle projecting eccentrically from said driving shaft, a forming member mounted for idle concentric movement on the axle and having a peripheral operating face, the movement of the forming member incident to the movement of the axle in the rotation of the shaft serving to move the forming member into and out of contact with the work on the anvil, said anvil having a die face corresponding in profile to the operating face of the forming member.

In testimony whereof I affix my signature.

WALTER REGINALD HUME.